US012759555B2

(12) United States Patent
Iwaki

(10) Patent No.: US 12,759,555 B2
(45) Date of Patent: Oct. 13, 2026

(54) CONTROLLER

(71) Applicant: ISUZU MOTORS LIMITED, Yokohama (JP)

(72) Inventor: Yuuki Iwaki, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 140 days.

(21) Appl. No.: 18/402,793

(22) Filed: Jan. 3, 2024

(65) Prior Publication Data

US 2024/0239347 A1 Jul. 18, 2024

(30) Foreign Application Priority Data

Jan. 12, 2023 (JP) ................................ 2023-003157

(51) Int. Cl.

*B60W 30/182* (2020.01)
*B60W 60/00* (2020.01)
*G06V 10/30* (2022.01)
*G06V 20/56* (2022.01)

(52) U.S. Cl.

CPC ........ *B60W 30/182* (2013.01); *B60W 60/001* (2020.02); *G06V 10/30* (2022.01); *G06V 20/56* (2022.01); *B60W 2554/80* (2020.02)

(58) Field of Classification Search

CPC ............. B60W 30/182; B60W 60/001; B60W 2554/80; B60W 50/14; B60W 50/0205; B60W 2050/0215; B60W 2420/408; G06V 10/30; G06V 20/56; G01S 17/86; G01S 7/4804; G01S 7/4806; G01S 17/88; G01S 17/89; G01S 17/894; G01S 17/93; G01S 17/931; G01S 17/04; G01S 17/06

See application file for complete search history.

(56) References Cited

U.S. PATENT DOCUMENTS

| | | | | |
|---|---|---|---|---|
| 9,489,635 | B1 * | 11/2016 | Zhu | G06V 10/987 |
| 10,963,734 | B1 * | 3/2021 | Wang | G06T 7/74 |
| 10,976,421 | B2 * | 4/2021 | Zhang | G01S 7/51 |

(Continued)

FOREIGN PATENT DOCUMENTS

| | | |
|---|---|---|
| JP | 2017-067464 A | 4/2017 |
| JP | 2020-154963 A | 9/2020 |

(Continued)

OTHER PUBLICATIONS

Translation of KR20220099473A retrieved from Espacenet on Apr. 17, 2026 (Year: 2026).*

*Primary Examiner* — Fadey S. Jabr
*Assistant Examiner* — Faris Asim Shaikh
(74) *Attorney, Agent, or Firm* — Shih IP Law Group, PLLC

(57) ABSTRACT

A controller includes: an acquisition part that acquires a detection result from a first sensor that is mounted on a vehicle and detects conditions of surroundings of the vehicle; a processing part that performs a first process or a second process, which is different from the first process, on the acquired detection result; a vehicle control part that controls the vehicle on the basis of a processing result of the processing part; and a receiving part that receives a processing operation related to processing of the detection result by a driver of the vehicle. When the receiving part receives the processing operation, the processing part switches between the first process and the second process.

5 Claims, 3 Drawing Sheets

(56) References Cited

U.S. PATENT DOCUMENTS

| | | | | |
|---|---|---|---|---|
| 11,163,820 | B1 * | 11/2021 | Morris | G06F 16/24578 |
| 11,609,568 | B2 * | 3/2023 | Oyama | B60K 28/10 |
| 2016/0001776 | A1 * | 1/2016 | Kim | B60W 30/165<br>701/96 |
| 2020/0202107 | A1 * | 6/2020 | Ozkucur | G06F 18/22 |
| 2020/0301019 | A1 | 9/2020 | Shiba | |
| 2021/0124054 | A1 | 4/2021 | Zhang et al. | |
| 2021/0239809 | A1 * | 8/2021 | Jang | G01S 7/497 |
| 2022/0113423 | A1 * | 4/2022 | Yang | G06T 15/10 |
| 2022/0214427 | A1 * | 7/2022 | Kim | G01S 7/4802 |
| 2022/0308234 | A1 * | 9/2022 | Oi | G01N 27/12 |
| 2023/0154313 | A1 * | 5/2023 | Wilmes | G01S 17/931<br>701/117 |
| 2023/0311951 | A1 * | 10/2023 | Kobayashi | B60S 1/0818<br>701/23 |
| 2023/0339498 | A1 * | 10/2023 | Noguchi | B60W 30/06 |
| 2024/0132032 | A1 * | 4/2024 | Matsumoto | B60T 7/22 |

FOREIGN PATENT DOCUMENTS

| | | | | |
|---|---|---|---|---|
| JP | 2020-154983 | A | 9/2020 | |
| JP | 2021-068419 | A | 4/2021 | |
| JP | 2022-026832 | A | 2/2022 | |
| KR | 20220099473 | A * | 7/2022 | G01S 7/4876 |

* cited by examiner

CONTROLLER

CROSS-REFERENCE TO RELATED APPLICATIONS

The present application claims priority to Japanese Patent Applications number 2023-003157, filed on Jan. 12, 2023 contents of which are incorporated herein by reference in their entirety.

BACKGROUND OF THE INVENTION

The present disclosure relates to a controller that controls a vehicle on the basis of a detection result of a sensor. A vehicle is equipped with LiDAR, a radar, and the like, which are sensors that detect surrounding conditions, and a controller of the vehicle processes detection results of the sensors to detect objects around the vehicle, thereby performing control (for example, speed and steering control) of the vehicle (see for example, Japanese Unexamined Patent Application Publication No. 2020-154983).

However, when the same process is always performed on the detection results of the sensors, noise in the detection results (e.g., point cloud data) increases with a change in surrounding conditions (e.g., change in weather) of the vehicle and causes an erroneous detection of objects around the vehicle, and therefore the vehicle cannon be appropriately controlled.

BRIEF SUMMARY OF THE INVENTION

The present disclosure focuses on this point, and its object is to control a vehicle in consideration of an erroneous detection of a sensor.

An aspect of the present disclosure provides a controller including: an acquisition part that acquires a detection result from a first sensor that is mounted on a vehicle and detects conditions of surroundings of the vehicle; a processing part that performs a first process or a second process, which is different from the first process, on the acquired detection result; a vehicle control part that controls the vehicle on the basis of a processing result of the processing part; and a receiving part that receives an operation related to processing of the detection result by a driver of the vehicle, wherein the processing part switches between the first process and the second process when the receiving part receives the operation.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Outline of a Vehicle

Figure 1:
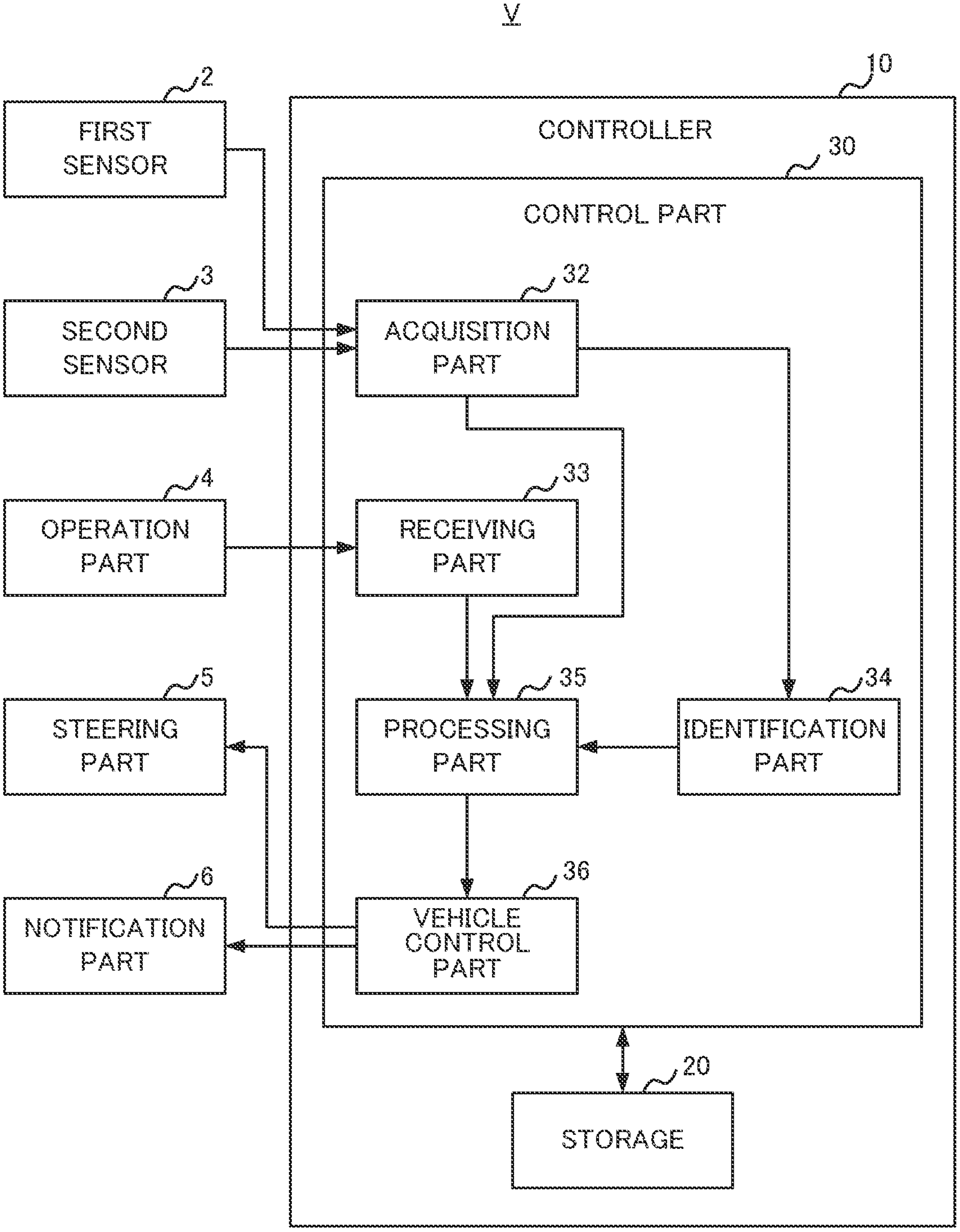
FIG. 1 shows a configuration of a vehicle V.

FIG. 1 shows a configuration of a vehicle V. Here, the vehicle V is a heavy vehicle such as a truck, but the present embodiment is not limited to this. The vehicle V includes a first sensor 2, a second sensor 3, an operation part 4, a steering part 5, a notification part 6, and a controller 10.

The first sensor 2 and the second sensor 3 are mounted on the vehicle V, and are detection sensors that detect the surrounding conditions of the vehicle V. Here, the first sensor 2 is LiDAR and the second sensor 3 is a radar, but the present embodiment is not limited thereto. For example, the second sensor 3 may be a camera. The first sensor 2 and the second sensor 3 can detect objects such as another vehicle and pedestrians around the vehicle V. The first sensor 2 and the second sensor 3 output detection results (for example, point cloud data) to the controller 10 so that the detection results are processed by the controller 10.

The operation part 4 is a part operated by a driver of the vehicle V. The operation part 4 includes an ignition key provided on a steering wheel of a vehicle, for example. The driver can select a processing operation related to processing performed on the detection results of the first sensor 2 and the second sensor 3 by the operation part 4.

The steering part 5 changes a traveling direction of the vehicle V by controlling the steering of the vehicle V. For example, when it is detected that an object is located in front of the vehicle V, the steering part 5 automatically steers the vehicle V so as to avoid the object in response to a command from the controller 10.

The notification part 6 has a function of providing notification in response to the command from the controller 10. For example, the notification part 6 provides notification if there is a risk that the vehicle V will come into contact with an object based on the detection results of the first sensor 2 and the second sensor 3. The notification part 6 outputs sound or displays, on a display screen, a message indicating that the vehicle is likely to contact the object, for example.

The controller 10 monitors the state and the like of the vehicle V and controls the operation of the vehicle V. In the present embodiment, the controller 10 performs a process of detecting an object or the like around the vehicle V from point cloud data (or reflected data of a radar or image data of a camera), which is the detection results of the first sensor 2 and the second sensor 3 (collectively referred to as the sensors), and controls the speed and steering of the vehicle V under autonomous driving control on the basis of a processing result.

Further, although details will be described later, when the controller 10 receives a processing operation operated by the driver via the operation part 4, the controller 10 switches a process to be performed on the point cloud data of the sensors. In this way, it is possible to detect the object or the like around the vehicle V with high accuracy by performing an optimal process on the point cloud data of the sensors according to the driver's intention.

Detailed Configuration of a Controller

A detailed configuration of the controller 10 will be described with reference to FIG. 1. The controller 10 includes a storage 20 and a control part 30.

The storage 20 includes a read only memory (ROM) storing a basic input output system (BIOS) of a computer or the like, and a random access memory (RAM) serving as a work area. The storage 20 is a large-capacity storage device such as a hard disk drive (HDD), a solid state drive (SSD), and the like that stores an operating system (OS), an application program, and various types of information to be referred to at the time of executing the application program.

The control part 30 is a processor such as a central processing unit (CPU) or a graphics processing unit (GPU). The control part 30 functions as an acquisition part 32, a receiving part 33, an identification part 34, a processing part 35, and a vehicle control part 36 by executing a program stored in the storage 20.

The acquisition part 32 acquires, from the first sensor 2, data which is a detection result. The acquisition part 32 acquires, from the second sensor 3, data which is a detection result. The acquisition part 32 acquires the detection results from the first sensor 2 and the second sensor 3 at predetermined intervals while the vehicle V is traveling. For example, the acquisition part 32 acquires detection results from the first sensor 2 and the second sensor 3 at 0.1 second intervals.

The receiving part 33 receives a driver's operation related to processing of the detection results of the first sensor 2 and the second sensor 3 (hereinafter, this operation is referred to as a processing operation as well). Specifically, when the driver performs the processing operation with the operation part 4, the receiving part 33 receives the processing operation from the operation part 4. The driver looks around at the surrounding conditions (for example, weather) of the vehicle V and selects a processing operation with the operation part 4.

Further, the receiving part 33 may receive, as the processing operation, (i) a first selection operation in which the degree of removal of point data in the point cloud data, which is the detection result of the first sensor 2, is large or (ii) a second selection operation in which the degree of removal is small. For example, the driver may select the first selection operation or the second selection operation according to the degree of deterioration of weather. Specifically, the driver selects the first selection operation when the degree of deterioration of weather is large (for example, the weather is rainy), and selects the second selection operation when the degree of deterioration of weather is small (for example, the weather is cloudy).

The identification part 34 identifies environmental conditions around the vehicle V. For example, the identification part 34 identifies weather around the vehicle V. The identification part 34 may identify weather from the detection result of the first sensor 2 or the second sensor 3. For example, when the first sensor 2 detects raindrops, snow, or fog, the identification part 34 identifies that it is bad weather such as rain. However, the present disclosure is not limited thereto, and the identification part 34 may obtain information about weather from an external server and identify weather around the vehicle V.

The processing part 35 performs a predetermined process on the detection results of the first sensor 2 and the second sensor 3. Here, the predetermined process is detecting objects such as another vehicle or pedestrians around the vehicle V by inputting point cloud data (or the reflection data of the radar or the image data of the camera), which is the detection result of the first sensor 2 or the second sensor 3, into a machine learning model. For convenience of explanation, the process performed on the detection result of the first sensor 2 will be described below. A similar process of reducing noise may be performed on the detection result of the second sensor 3.

The processing part 35 performs a first process or a second process, which is different from the first process, on the detection result acquired by the first sensor 2. Here, the first process is detecting an object in the surroundings using point cloud data which is the detection result of the first sensor 2. The second process is detecting an object in the surroundings using data obtained by removing some pieces of point data from the point cloud data. In other words, the second process includes performing filtering on a detection result of a sensor before the first process. Therefore, the processing part 35 performs the first process when there is less noise in the point cloud data which is the detection result of the first sensor 2, and performs the second process when there is a lot of noise in the point cloud data.

Figure 2A:
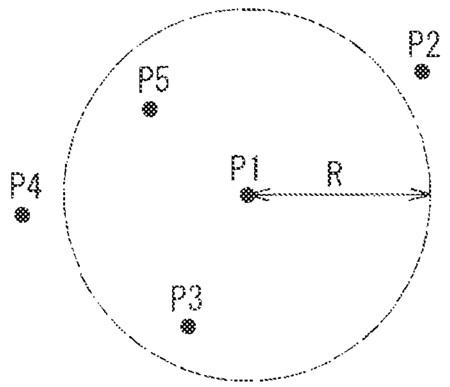
FIGS. 2A and 2B are each a schematic diagram for explaining filtering of point cloud data.
Figure 2B:
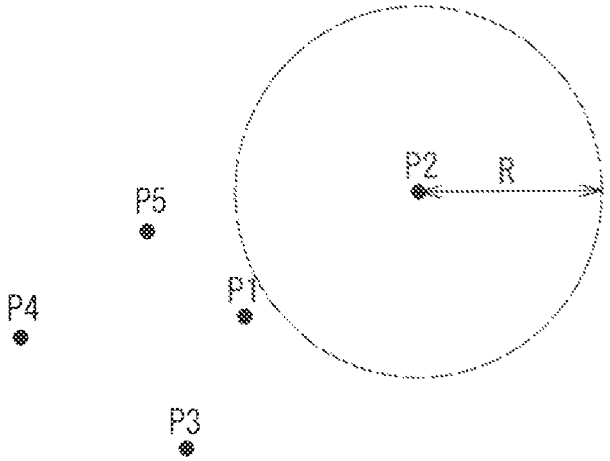

FIGS. 2A and 2B are each a schematic diagram for explaining filtering of point cloud data. In FIGS. 2A and 2B, for convenience of explanation, points P1 to P5 are shown as the point cloud data, but actually, a large number of points constitute the point cloud data. The processing part 35 performs filtering to remove a point corresponding to noise among the points P1 to P5.

The processing part 35 determines whether any of the points P2 to P5 exist within a circle with a radius R from the center of the point P1. The radius R is a threshold for removing noise. As shown in FIG. 2A, since at least one point (here, points P3 and P5) exists within the circle around the point P1 with the radius R, the processing part 35 determines that the point P1 is not noise. On the other hand, as shown in FIG. 2B, the points P1 and P3 to P5 (i.e., points other than point P2) do not exist within a circle with the radius R from the center of the point P2. Therefore, the processing part 35 determines that the isolated point P2 is noise, and removes the point P2 from the point cloud data. The points P3 to P5 are not determined to be noise since other points exist within the respective circles around the points P3 to P5 with the radius R, in a similar manner with the point P1. The processing part 35 detects an object or the like using point cloud data resulting from the removal of the point determined to be noise.

The processing part 35 switches to the first process or the second process when the receiving part 33 receives a processing operation. For example, when the receiving part 33 receives the processing operation while one of the first process and the second process is being performed, the processing part 35 switches to the other among the first process and the second process. Specifically, when the receiving part 33 receives the processing operation while the first process is performed on the detection result of the first sensor 2, the processing part 35 changes the first process to the second process. Similarly, when the receiving part 33 receives the processing operation while the second process is being performed, the processing part 35 may switch the second process to the first process. In this manner, the processing part 35 performs the first process or the second process according to the driver's intention. Further, frequent switching of the first process with the second process due to disturbances or the like can be prevented by switching between the first process and the second process upon reception of the driver's processing operation.

The processing part 35 removes the point data from the point cloud data in response to the first selection operation or the second selection operation received as the processing operation by the receiving part 33. The processing part 35 reduces the radius R shown in FIGS. 2A and 2B in a case where the receiving part 33 receives the first selection operation, and increases the radius R shown in FIGS. 2A and 2B in a case where the receiving part 33 receives the second selection operation. When the radius R is small, the point data is more likely to be determined as noise than in the case where the radius R is large (in other words, the smaller the radius R, the greater the degree of removal). By removing the point data according to the first selection operation or the second selection operation as described above, the point data can be removed from the point cloud data while reflecting the driver's intention. It should be noted that cases concerning the first selection operation and the second selection operation have been described above, but there may be three or more selection operations so as to further subdivide the degree of removal.

When performing the second process, the processing part 35 may process both the detection result of the first sensor 2 and the detection result of the second sensor 3. Under circumstances where noise is likely to be contained in the point cloud data, the object can be detected with higher accuracy by using both the detection results of the first sensor 2 and the second sensor 3 than by detecting the object on the basis of the point cloud data of the first sensor 2. Since an object to be detected with ease differs for the first sensor 2 and the second sensor 3 due to their detection methods being different, it becomes easier to appropriately detect various objects by using both the detection results of the first sensor 2 and the second sensor 3 in the second process.

The processing part 35 may make a speed of the vehicle V at the time of performing the second process slower than a speed of the vehicle V at the time of performing the first process before switching. Since it is difficult to appropriately detect a distant object when performing the second process, it is possible to prevent contact with the distant object by decelerating the vehicle V.

If the environmental condition around the vehicle V is bad weather, the processing part 35 may switch the first process to the second process. Specifically, the processing part 35 switches the first process to the second process if the identification part 34 identifies that the weather is bad. In the case of bad weather, noise is likely to be contained in the point cloud data, which is the detection result of the first sensor 2. Therefore, erroneous detection of an object can be prevented by having the processing part 35 perform filtering for removing noise in the case of bad weather.

The vehicle control part 36 controls the vehicle V on the basis of the processing result of the processing part 35. That is, the vehicle control part 36 controls the vehicle V on the basis of the processing result of the first process or the second process of the point cloud data by the processing part 35. The vehicle control part 36 controls the steering with the steering part 5 and notification with the notification part 6, as control of the vehicle V. For example, when it is determined from the processing result of the processing part 35 that another vehicle in front of the vehicle V is at a stop, the vehicle control part 36 automatically steers the steering part 5 to avoid the other vehicle, or causes the notification part 6 to warn about the presence or the like of the other vehicle. The vehicle control part 36 may cause the vehicle V to slow down and stop in order to stop the vehicle V before reaching another vehicle.

Example of Operation of the Controller

Figure 3:
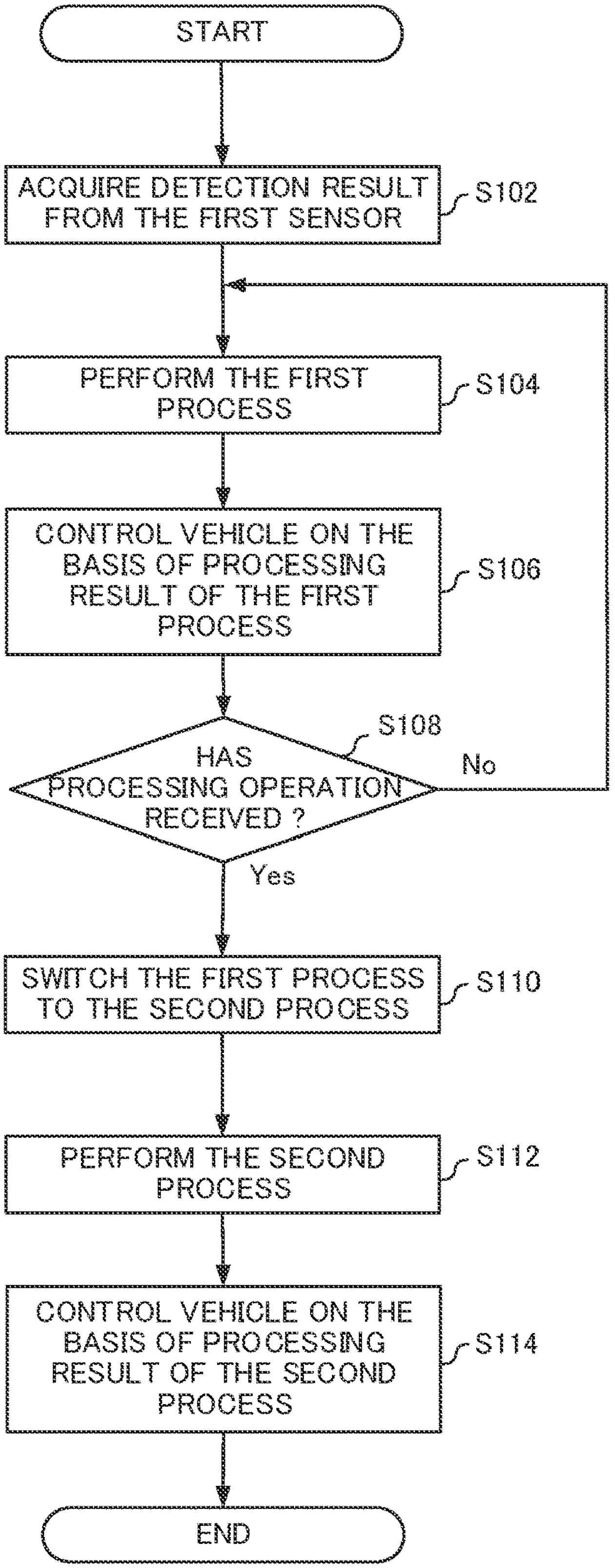
FIG. 3 is a flowchart showing an operation of a controller 10.

FIG. 3 is a flowchart showing an operation of the controller 10. The flowchart shown in FIG. 3 is continuously executed during autonomous driving of a vehicle V, for example. In the following description, processing based on the detection result of the first sensor 2 will be described as an example, but processing based on the detection result of the second sensor 3 is similarly performed as well.

First, the acquisition part 32 acquires a detection result from the first sensor 2 (step S102). Specifically, the acquisition part 32 acquires point cloud data of the first sensor 2.

Next, the processing part 35 performs a first process on the detection result (point cloud data) of the first sensor 2 acquired by the acquisition part 32 (step S104). Specifically, the processing part 35 determines whether objects such as another vehicle and pedestrians which may be in contact with the vehicle V exist around the vehicle V on the basis of the point cloud data.

Next, the vehicle control part 36 controls the vehicle V on the basis of the processing result of the first process (step S106). For example, when the vehicle control part 36 detects an object (for example, another vehicle stopping ahead) around the vehicle V from the first process, the vehicle control part 36 controls the speed and steering of the vehicle V so as to avoid the object.

Next, the processing part 35 determines whether the receiving part 33 has received a processing operation of the driver (step S108). For example, when weather deteriorates and the driver selects a processing operation with the operation part 4, the receiving part 33 receives the processing operation.

If the processing operation has not been received in step S108 (No), the processing part 35 repeats the processes in steps S104 and S106. On the other hand, if the processing operation has been received in step S108 (Yes), the processing part 35 switches the first process to the second process (step S110). Then, the processing part 35 performs the second process after switching (step S112). That is, the processing part 35 performs the second process of performing the first process after removing point data that is noise from the point cloud data. At this time, the processing part 35 may process both the detection result of the first sensor 2 and the detection result of the second sensor 3 to detect the object around the vehicle V.

Next, the vehicle control part 36 controls the vehicle V on the basis of the processing result of the second process (step S114). That is, when the object is detected around the vehicle V from the second process, the vehicle control part 36 controls the speed and steering of the vehicle V so as to avoid the object.

Effect of the Present Embodiment

The controller 10 of the embodiment described above switches between the first process and the second process of the point cloud data upon reception of the driver's processing operation related to processing of the detection result (point cloud data) of the first sensor 2. For example, when the controller 10 receives the processing operation when performing the first process, the controller 10 switches the first process to the second process. In this case, an appropriate process can be performed on the point cloud data by having the driver operate the processing operation according to the surrounding conditions of the vehicle V. For example, in a situation in which noise is likely to be contained in the point cloud data (specifically, bad weather), by switching to the second process in which noise is easily removed in the point cloud data, it is possible to determine objects around the vehicle V with high accuracy, and as a result, it is possible to appropriately control the speed and steering of the vehicle V with respect to the object. Further, by switching the first process and the second process on the basis of the operation processing of the driver, frequent switching of the first process to the second process due to disturbance or the like can be prevented.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments

What is claimed is:

1. A controller of a vehicle comprising:

a processor coupled to a memory storing instructions for the processor to function as:

an acquisition part that acquires point cloud data as a detection result from a first sensor that is mounted on a vehicle and detects conditions of surroundings of the vehicle at predetermined intervals while the vehicle is traveling;

a processing part that performs a first process or a second process, which is different from the first process, on the acquired point cloud data, the first process is a process of detecting an object in the surroundings of the vehicle on the basis of the point cloud data, and the second process is a process of performing the first process after filtering the point cloud data by removing, as noise, point data for which no other point data exists within a threshold distance from the point data in the point cloud data;

a vehicle control part that controls steering by a steering part of the vehicle on the basis of a processing result of the processing part; and a receiving part that receives an operation related to processing of the point cloud data by a driver of the vehicle during driving of the vehicle, wherein the processing part switches between the first process and the second process during driving of the vehicle when the receiving part receives the operation;

wherein the receiving part receives, as the operation, a first selection operation in which the degree of removal of the point data in the second process is large or a second selection operation in which the degree of removal is small, and the processing part removes the point data from the point cloud data in response to the received first selection operation or second selection operations, wherein the processing part decreases the threshold distance in response to the first selection operation and increases the threshold distance in response to the second selection operation.

2. The controller according to claim 1, wherein the processing part processes both a detection result of the first sensor and a detection result of a second sensor, which is different from the first sensor, as the second process.

3. The controller according to claim 1, further comprising:

an identification part that identifies weather from the detection result of the first sensor, wherein the processing part switches the first process to the second process when it is identified that the weather is bad.

4. The controller according to claim 3, wherein the processing part makes a speed of the vehicle at the time of performing the second process slower than a speed of the vehicle at the time of performing the first process before switching.

5. The controller according to claim 1, wherein the processing part switches to the other among the first process and the second process when the receiving part receives the operation while one of the first process and the second process is being performed.

* * * * *